(12) United States Patent
Bandler

(10) Patent No.: US 9,615,544 B2
(45) Date of Patent: Apr. 11, 2017

(54) ANIMAL RESTRAINT

(71) Applicant: Mindy Bandler, Hoboken, NJ (US)

(72) Inventor: Mindy Bandler, Hoboken, NJ (US)

( * ) Notice: Subject to any disclaimer, the term of this patent is extended or adjusted under 35 U.S.C. 154(b) by 0 days.

(21) Appl. No.: 14/468,260

(22) Filed: Aug. 25, 2014

(65) Prior Publication Data

US 2016/0050886 A1 Feb. 25, 2016

(51) Int. Cl.
*A01K 27/00* (2006.01)

(52) U.S. Cl.
CPC .......... *A01K 27/003* (2013.01); *A01K 27/001* (2013.01)

(58) Field of Classification Search
CPC .. A01K 27/001; A01K 27/003; A01K 27/005; A01K 27/002; A01K 27/00
USPC ....... 119/792, 793, 795, 770, 798, 864, 856, 119/863, 865, 905, 907
See application file for complete search history.

(56) References Cited

U.S. PATENT DOCUMENTS

| | | | | | |
|---|---|---|---|---|---|
| 3,769,939 | A | * | 11/1973 | Wais | A01K 15/04 119/819 |
| 5,325,819 | A | * | 7/1994 | Krauss | A01K 27/002 119/792 |
| 5,682,840 | A | * | 11/1997 | McFarland | A01K 27/002 119/792 |
| 5,791,295 | A | * | 8/1998 | Schmid | A01K 27/003 119/793 |
| 5,893,339 | A | * | 4/1999 | Liu | A01K 27/002 119/770 |

* cited by examiner

*Primary Examiner* — Trinh Nguyen
(74) *Attorney, Agent, or Firm* — The Law Offices of Roger S. Thompson

(57) ABSTRACT

A secondary restraint for restraining an animal in the event of the failure of a primary restraint. The secondary restraint preferably includes a length of nylon fabric having a ring on one end and a releasable hook on the other. The ring is sized so that the hook will fit through the ring. In use, the length of fabric is wrapped around the neck of the animal to be restrained, and the hook is passed through the ring. The hook is then attached to a ring on the primary restraint. If the primary restraint, such as a collar or harness, slips from the animal, the leash attached to the ring on the primary restraint will pull freely, tightening the secondary restraint and preventing the escape of the animal being restrained.

7 Claims, 1 Drawing Sheet

ANIMAL RESTRAINT

BACKGROUND OF THE INVENTION

1. Field of the Invention

The invention relates to the field of animals restraints and, more particularly, to the field of devices useful in restraining or maintaining control of animals while leashed or harnessed.

2. Description of the Related Art

One of the prime characteristics of human society is the ability to domesticate animals, and domestication requires the exercise of some sort of control over the animal. With respect to most commonly domesticated animals, such as household pets, that control often takes the form of a leash or restraint to guide or restrain the animal.

As used herein, the term "restraint" is intended to include any device useful to control an animal from a short distance, such as a leash (retractable or fixed), harness, collar or other device. As also used herein, the term "leash" may be used interchangeably with "restraint" for ease of reference. Restraints may be made of any suitable material, which means that the material should be durable, not susceptible to breaking or wearing. Suitable materials include nylon, leather, rope, cord, other plastics, metal chains and other similar materials.

Pet owners, particularly pet owners in urban or suburban settings, need to ensure that they are able to control their pets at all times when out of the house or other enclosed area (such as a yard or barn), and so nearly always use a leash of some sort. According to current conventions, leashes are nylon ribbons having a handle, such as a loop in the ribbon, on one end and some means for securing the animal on the other. The means for securing the animal may take many forms.

In its most basic form, the means for securing the animal may be a simple collar worn about the animal's neck. The neck is usually chosen as it is the narrowest portion of the anatomy of most relevant animals, thereby providing the location on the animal from which escape is least likely.

Conventional animal collars are also made of a nylon ribbon, with a releasable clasp, made up of two mating pieces on the opposite ends of the ribbon. The two mating pieces are used to secure the collar in place. Collars generally include some means for adjusting the length of the collar to fit securely, but not too tightly, to the animal's neck. Finally, conventional collars generally include a metal ring at or near one of the two mating ends. The ring is used for attachment of the restraint, and/or securing of other items, such as licenses, rabies tags and the like to the animal.

Attachment of the leash to a simple collar on the animal's neck is not always a completely satisfactory solution to the securing of the leash, because animals, especially active dogs, can slip out of their collars. This is a danger because most owners, correctly, do not place the collar on the animal very tightly, so that the animal can breathe comfortably. An active animal, such as a playful dog, can often slip out of the collar if it is loose, and the animal tugs opposite to the direction of the owner holding the handle of the leash.

Having an animal slip its leash can be very dangerous. If the animal is just being playful, it could still bolt from the owner and run out into traffic. A vicious dog that slips its leash can be quite problematic for different reasons.

Even if the animal does not slip its collar, it is still possible for the collar securing mechanism to fail, such as simply pulling open or breaking. No matter the reason, the result is the same, and equally undesirable.

There have been efforts made to provide more secure restraints, such as metal chain "choke" collars and body harnesses. So-called "choke" collars are loose collars, usually made of chain link, that comprise a length of chain links having loops at the opposed ends thereof. In use, the body of the chain is slipped through one of the loops and pulled, so that the two loops come into contact, forming a loop of chain with an opening in the middle. The leash is attached to the free end of the choke collar. The opening is then slipped over the animal's head and the leash is pulled to draw the free end of the chain, closing the opening about the neck of the animal. This provides a secure hold when the leash is pulled, but many feel it is cruel to use this device routinely, because it tends to restrict the animal's breathing.

A harness is a device usually attached about the animal's body. A standard body harness has a belt which goes about the animal's midsection, and straps which form loops for the animal's forelegs. The various straps are adjustable to fit the animal's dimensions, but the various straps are usually secured by the same sort of clasps as described above, and suffer from the same failings, including the possibility that an active animal may slip even from a harness.

There are thus problems with known systems for securing animals when outside, and there is a need to provide some means for securing animals who might slip their restraint.

It will be understood that this need is especially keenly felt by those who care for dogs professionally, such as dog walkers or trainers, who might have several animals on leashed simultaneously, exponentially increasing the risk of slipping a leash as well as inhibiting the ability of the professional to react immediately to the slippage due to the need to care for the "un-slipped" animals.

SUMMARY OF THE INVENTION

The object of the invention is to provide an improved restraint and method for its use, to avoid an animal's escape from a restraint in the event of a failure of a primary restraint.

It is a further object of the invention to provide a restraint which can be used safely in conjunction with existing animal restraints, and thereby keep an animal safe even if it slips its primary restraint.

It is still another object of the invention to provide a restraint which is inexpensive and easy to manufacture, as well as safe for the animal being restrained.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
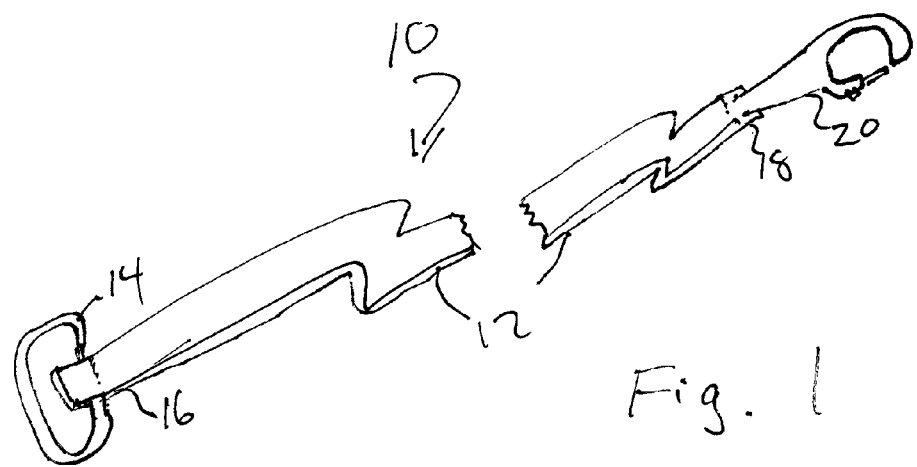
FIG. 1 shows a secondary restraint according to the invention, in perspective.

FIG. 1 shows a secondary restraint in accordance with the invention, generally at 10. Restraint 10 includes a length of material 12, preferably of nylon, although it could be of any suitable material, including leather, chain link or other material not subject to wear or abrasion under expected use.

In a preferred embodiment, length of material 12 may be a collar formed by the material looping through a ring 14 attached to a first end 16 thereof. At a second end 18 of length of material 12 a releasable hook 20 of conventional structure is attached. Ring 14 is sized so that hook 20 may pass therethrough, and may otherwise be of any suitable size or material as could be determined by one of ordinary skill in the art without undue experimentation. In the preferred embodiment, ring 14 is a metal (steel) "O"-ring, although other structures, such as a rectangle, "D"-ring or the like is possible, just as ring 14 may be formed of hard plastic, leather or other durable material.

Figure 2:
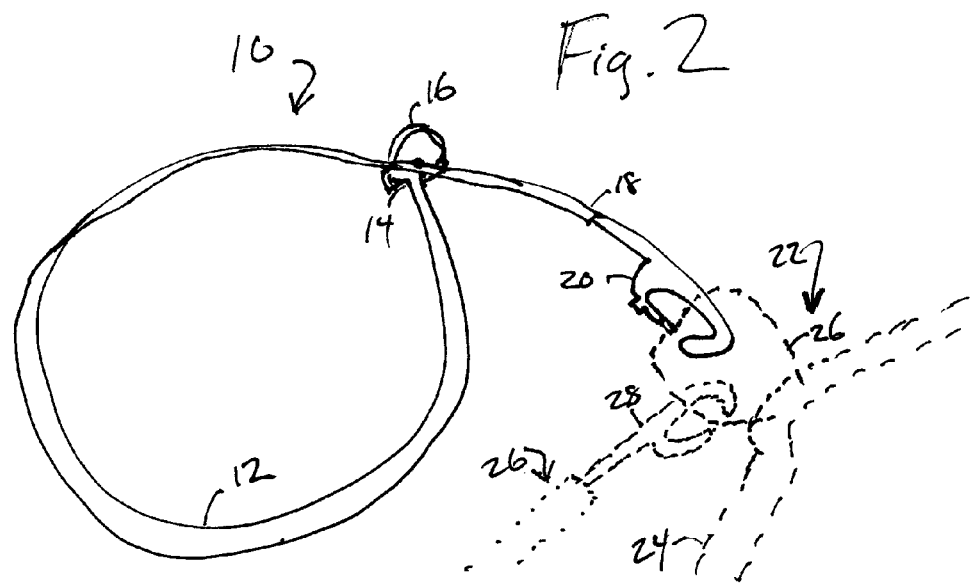
FIG. 2 shows the secondary restraint of FIG. 1 in use with a prior art primary restraint.

In use, restraint 10 is intended for use with a primary restraint 22 shown in phantom in FIG. 2. Primary restraint 22 includes a first collar or harness 24 for restraining the animal (not shown). Primary restraint 22 further includes a ring 26 to which a leash 26 is attached though a releasable hook 28.

Hook 20 is likewise attached to ring 26 in known fashion, but is not hooked directly to hook 28. Thus, when the animal is properly under restraint via primary restraint 22, secondary restraint 10 is under no stress and simply hangs loosely. However, if primary restraint 22 slips from the animal, or other fails, leash 26 remains attached to ring 26, as does hook 20, coupling leash 26 to secondary restraint 10 without further action by the user, and allowing the user to continue to control the animal.

In the preceding Detailed Description, reference was made to the accompanying drawings, which form a part of his disclosure, and in which are shown illustrative specific embodiments of the invention. In this regard, directional terminology, such as "top", "bottom", "left", "right", "front", "back", etc., is used with reference to the orientation of the Figure(s) with which such terms are used. Because components of embodiments can be positioned in a number of different orientations, the directional terminology is used for purposes of ease of understanding and illustration only and is not to be considered limiting.

Additionally, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A secondary restraint for an animal, for use with a primary restraint, the primary restraint including a first attachment means for attaching the primary restraint to the animal, the secondary restraint comprising:
    a collar portion for encircling a part of the body of the animal, said collar portion having a first end and a second end;
    means for establishing a variable area bordered by said collar portion, whereby the body part of the animal may be positioned within said variable area and encircled by said collar portion, said means for establishing being located near said first end of said collar portion; and
    a second attachment means, located near said second end of said collar portion, for coupling the secondary restraint to the primary restraint for activation of the secondary restraint only in the event of failure of the primary restraint;
    whereby, in the event of failure of the primary restraint said second attachment means is actively coupled to the primary restraint so that the primary restraint may reduce said variable area and thereby restrain the animal; and
    whereby, so long as the primary restraint remains effective, said variable area remains loose about the body part of the animal and the secondary restraint remains inactive.

2. The animal restraint of claim 1, wherein said collar portion is a length of material.

3. The animal restraint of claim 2, wherein said material is nylon fabric.

4. The animal restraint of claim 1, wherein said means for establishing includes a ring, said ring having an internal open area of a size sufficient to permit the passage therethrough of said second attachment means.

5. The animal restraint of claim 1,
    wherein the primary restraint includes a first restraint attached to the animal and a leash, the first restraint having an attachment mechanism for releasably attaching the leash to the first restraint; and
    wherein said second attachment means includes a fastener for releasably fastening the secondary restraint to the attachment mechanism of the primary restraint.

6. The animal restraint of claim 5, wherein the attachment mechanism includes a second ring; and
    wherein said fastener is a releasable hook configured to hook to said ring.

7. A secondary restraint for an animal, for use with a primary restraint, the primary restraint including a first attachment means for attaching the primary restraint to the animal, the first attachment means having a first restraint attached to the animal, a first ring and a leash releasably attachable to the ring, the secondary restraint comprising:
    a length of material for encircling a part of the body of the animal, said length of material having a first end and a second end;
    a releasable hook, located near said second end of said length of material, for coupling the secondary restraint to the first ring for activation of the secondary restraint only in the event of failure of the primary restraint;
    a second ring for establishing a variable area bordered by a collar portion, whereby the body part of the animal may be positioned within said variable area and encircled by said collar portion, said second ring being located near said first end of said collar portion and having an internal opening of sufficient size to permit the passage therethrough of said releasable hook;

whereby, in the event of failure of the primary restraint said hook is actively coupled to the primary restraint so that the primary restraint may reduce said variable area and thereby restrain the animal; and whereby, so long as the primary restraint remains effective, said variable area remains loose about the body part of the animal and the secondary restraint remains inactive.

* * * * *